Patented Oct. 7, 1952

2,613,151

UNITED STATES PATENT OFFICE 2,613,151

METHODS OF PROCESSING MEAT PRODUCTS

John S. Forsyth, Chicago, Ill., assignor to Wilson & Co., Inc., a corporation of Delaware No Drawing. Application June 30, 1950, Serial No. 171,567

10 Claims. (Cl. 99—159)

The present invention relates to methods for the processing of meat products and more particularly to the preparation of so-called "pickled" meat products which are marketed in containers of varying sizes and in which the attainment of a proper coloring as well as the desired flavoring during curing are required.

In the preparation of various pickled meat products, such as split pigs' feet, semi-boneless pigs' feet, "tid-bits," and the like, the processes hitherto used have been lengthy and laborious and conducive of highly undesirable conditions in operation, from the standpoints both of sanitation and of disagreeable labor conditions. In accordance with the process of the present invention, the time required for carrying out the necessary steps prior to packaging is greatly reduced, as are the inconveniences in operation and the necessity for extensive handling of the material under treatment; and at the same time a product is secured which is of better color and better appearance generally and with a much more stable color than the product produced according to prior methods. In order that it may be fully understood, the process of the present invention will be described in connection with the preparation of pickled pigs' feet and like products.

In general, in preparing pickled pigs' feet, the fore feet of the pig are employed, the hind feet being less meaty and being frequently deformed by the shackles from which the carcass of the hog is suspended while being dressed. Certain meaty trimmings from the hind feet are sometimes processed in the same manner as are the fore feet, to produce what are known as pickled "tid-bits." In the preparation of the pickled pigs' feet, the larger feet, weighing 16 ounces or more, are generally used in preparing what are known as "semi-boneless feet," being partially boned and sliced during the process of preparation. Smaller feet, weighing less than 16 ounces, are, during the process, slit in half and are known as "split feet." In the procedures herein described, the use of fresh feet is preferred. However, frozen feet may be employed providing they are preliminarily removed from refrigeration and permitted to thaw to an internal temperature of around 40° F.

For purposes of illustration, the preparation of pickled semi-boneless pigs' feet will be considered. In the conventional method of preparation, as hitherto used, the feet are placed in large vats or tierces, generally made of oak, and capable of handling large lots, say of approximately 1000 pounds. About 110 gallons of pickle are used per vat or tierce of this size. The pickle employed is a saturated brine containing about 175 p. p. m. (parts per million) of sodium nitrite. In the standing vat process, the feet must be agitated daily by hand to give a uniform pickle supply to the feet. This agitation is a laborious and inconvenient process, requiring in effect the handling of all of the material daily. A minimum time of 11 days is required for the curing period, although in general 14 days or more are employed. By using circulating vats, with the pickle circulated through a series of vats in a battery, the minimum time of cure may be reduced to 7 days. The curing step is effected at low temperature, the temperature of the pickle and of the cellars in which the curing is effected being held at approximately 40° F.

After the curing period, the feet are transferred to another room where they are subjected to the cooking operation. This is generally effected in large stainless steel tanks which may suitably hold from 1000 to 1500 pounds of feet each. The cured feet are placed in these cooking tanks, which contain boiling water, preferably acidulated by the addition of about 3 gallons of 90 grain vinegar per 1000 pounds of feet. The feet are cooked in this slightly acid liquid, for example, by direct injection of live steam, a slow boil being used throughout the cook. The cooking time is varied somewhat in the discretion of the operator, being terminated when the feet are thoroughly cooked, being then in such condition that the bones break through the skin and the feet are just short of falling to pieces as the bones are pulled apart. Approximately 3 to 3½ hours cooking are required. When the feet are cooked, they are chilled with cold running water to an internal temperature of about 55° to 60° F.

After chilling, the cured and cooked feet are boned, the greater proportion of the bones in the foot being removed, leaving in place in a conventional pattern only a few bones which do not interfere with the slicing of the feet. After boning, they are washed by being covered with cold water for a short period, say about 30 minutes. Small fat and meat particles resulting from the boning process rise to the surface of the water and are skimmed off. The feet are then sliced, generally into either three or four slices, depending on their size. The slices are then weighed and packed into jars or containers of varying conventional sizes. After filling with the required weight of meat, the jars or containers are filled to overflowing with vinegar containing the desired spices and condiments, the vinegar being of a strength of generally 45 to 55 grains. The jars are then sealed under vacuum and held in storage for two weeks or longer, during which the meat absorbs a certain amount of the pickling liquid, usually from 20 to 25% of the weight of the meat. The temperature at which they are held during this period is from 55° to 60° F. They are then ready for distribution.

Certain conditions are important with respect to the cured product. The lean meat in the product must be uniformly colored, and be reddish or reddish pink in color. It should be free from dark streaks resulting from discoloration due to presence of blood in the minute blood vessels. The skin and fat should likewise be uniform in color and the skin should have a slightly pinkish cast. The liquid in the package, as placed on the retailers' shelves, should be clear and not cloudy or murky in appearance. The color of the meat should be stable and should resist oxidation, either from such small amounts of oxygen as are present in the air remaining in the containers when packed or on reasonable exposure to the air after the packages or containers are opened.

The color changes in the meat during processing are due largely to nitrous oxide formed from the sodium nitrite, the nitrous oxide forming with the hemoglobin in the meat juices initially a semi-stable red pigment called nitrosohemoglobin, which reverts, under suitable temperature and time condition, to a more stable red pigment known as nitrosohemochromogen. The latter pigment may be converted, under improperly controlled conditions, to pigments ranging from brownish-gray to green in color and as is readily apparent, such changes must be avoided. They may result from excessive oxidation, from the action of various microorganisms, and from premature oxidation of hemoglobin to oxyhemoglobin and methemoglobin and further oxidation of these compounds.

As will be apparent from the preceding description of the process as generally used, the minimum time required for preparation prior to canning or packaging, using stationary pickling vats, is approximately 12 days, and when using circulating vats, 8 days, and in general a longer time is preferred. After being packaged in jars or containers, a holding or storage period of about 14 days is required to permit the meat to absorb the proper quantity of liquid.

Split pigs' feet and other meat products derived from hogs or other animals are processed in a similar manner, with such variations in cooking time as are necessary to effect the desired thorough cooking of the meat.

By operating in accordance with the present invention, the total time of preparation of the meat products prior to packaging is reduced to approximately 8 hours. The pickling in a saturated brine and the inconveniences incident thereto are entirely dispensed with. A part of the curing process is transferred to the packages or containers, but the necessary period of storage of about 14 days is not increased.

In carrying out the process of the present invention, the meat product, for example, pigs' feet, is first subjected to a progressive heating and cooking operation in the presence of a dilute aqueous salt solution containing sodium nitrite. The salt may be entirely dispensed with in the solution used in this stage, but in general it is found that, when no salt is used, the pigments formed are less stable and have a tendency to become lighter in the container in which the product is ultimately packed with vinegar. It is therefore preferred to use salt in this stage of operation to the extent of 2% to 10% by weight in the solution employed, and preferably from 4% to 6%. Proportions of salt in excess of 10% are not desirable, since such high proportions tend to produce too red a skin color and likewise tend to interfere with the laking of entrapped blood and hence to leave more black veins or streaks in the finished product than is desirable. The amount of sodium nitrite present is in the range of from about 10 and preferably about 50 to 180 p. p. m. Optimum results are secured with 100 to 150 p. p. m. Sufficient vinegar may be introduced to give the solution a pH of from 7.5 to 5.0, and preferably from 6.0 to 5.5. Thus, a suitable solution for use in jacketed kettles contains 4% salt, 125 p. p. m. sodium nitrite and sufficient vinegar to give a pH of 6.0 to 5.5. When open steam is used for heating, the concentration of each of the constituents of the pickling liquid should be increased slightly, say about 10%, but maintained within the maximum limits hereinbefore set forth, thereby compensating for dilution during cooking.

The feet, immersed in this solution, are then subjected to heating, preferably under controlled conditions whereby a partial curing and cooking are effected. In the first part of this operation, the rise in temperature in the material may be controlled to effect "laking"; i. e., the removal of blood from the small blood vessels in the feet so as to avoid or prevent the presence of black streaks in the final cured product. These streaks result from the coagulation and discoloration of any blood which is so retained. In order to accomplish this laking effect, in the first stage of the heating operation, the heating is so controlled that the temperature in the deepest portions of the feet increases progressively and gradually from their initial temperature to a temperature of 130° to 140° F. in a period of 1.5 to 2 hours.

It is desirable that the temperature increase with respect to time in this stage be quite even and approximate a straight line curve, although some deviation from the straight line curve is permissible and in fact may be unavoidable by reason of the character of the kettle and heating equipment used. Thus, with an externally heated or jacketed kettle of about 1700 pounds fluid capacity containing 650 to 700 pounds of feet and 1000 pounds of the solution as above described, satisfactory results are secured by raising the temperature of the liquid in the kettle to 120° F. and holding it at this temperature for 60 minutes; then raising the temperature of the liquid to 130° F. and holding it at this temperature for 30 minutes; and finally raising the temperature of the liquid to 140° F. and holding it at this temperature for 15 minutes. Operating in this way, in the first 60 minutes, the temperature within the feet showed a gradual and progressive rise in the first 60 minutes to approximately 108° F., at which time the temperature of the liquid surrounding the feet was raised to 130° F. At the end of the next 30 minutes the temperature within the feet had increased gradually but at a somewhat slower rate to a temperature of about 125° F., at which time the temperature of the liquid was raised to 140° F. In the next 15 minutes the temperature within the feet had increased progressively to approximately 128° F. Under these conditions of operation, the blood trapped in the fine capillaries and small veins deep in the foot was almost completely cleared so that substantially no markings resulting therefrom appeared in the final product. During this portion of the heating operation the feet suffer a loss in color so that the skin becomes somewhat grayish.

At the termination of the first portion of the heating operation, the temperature of the liquid is brought to cooking temperature as rapidly as the equipment permits. The time required may range from about 5 minutes to about 50 minutes, depending upon the character of equipment employed and size of batch treated, but is preferably so controlled as to be effected in from 7 to 20 minutes. The temperature within the feet rises to cooking temperature at a rate depending upon the rate of heating of the liquid. During this intermediate heating period, known as the transition period or "come-up" period, there is a development of color in the skin of the feet. With slower transition periods, as secured in the slow heating equipment, the color developed in this stage is not great. However, with a rapid transition period of say 7 to 15 minutes, a fairly intense or bright color is secured, this color being considerably brighter than that secured in the final product.

The heating is then continued at a temperature of 200° F. to boiling temperature to complete the cooking of the feet. It is preferred that the cooking temperature be controlled at a maximum temperature of 208° F. or in the range of from 200° to 208° F., since cooking at a higher temperature or at what is known as a violent boil results in a tendency to clouding in the finished packed product. Considering the cooking of the feet as starting 5 to 10 minutes after the temperature of the liquid reaches 205 to 210° F., cooking to the desired boning condition usually requires 3¼ to 3½ hours. During this stage of the process, the normal changes in pickle concentration due to evaporation are tolerated by the product without ultimate deleterious effect. At the completion of the cooking, as in prior cooking processes, the feet may be readily boned. As soon as this stage is reached, fat rendered out of the feet is skimmed off, the cooking liquor is removed and the feet are rapidly chilled with cold running water to an internal temperature below 65° F. and preferably in the range of 55° to 60° F.

The feet are then boned and sliced in the conventional manner, care being taken preferably during the slicing to split the heavy cartilage tube extending down the center of each foot so as to expose any enclosed lean meat for contact with the solution employed in the second or immersion step of the process. In the case of meat products of smaller size, the slicing is unnecessary.

At this stage of the operation, it may be noted that the lean meat inside the foot is not uniform in color. Approximately half will show a cured color, but areas will be present which do not have a cured color but have the light brown color of fresh cooked meat. The cooked feet are then treated to effect absorption of nitrite to effect the final curing of the feet. For example, the cooled, cooked and partially cured feet are placed in containers, suitably stainless steel trucks having drain valves at the bottom covered with screens. The containers are filled with the sliced feet to a short distance from their tops and the feet are then covered with a dilute acid solution containing sodium nitrite. In preparing this solution, sufficient vinegar is employed to give an acetic acid concentration of 0.50 to 1.5% and preferably about 0.75%. Higher concentrations of acetic acid may be employed, say up to about 10%, or even higher, but the lower concentrations are preferred to avoid irritation of the workers' hands. The concentration of sodium nitrite in the solution may be from 50 to 200 p. p. m. and is preferably about 125 p. p. m.

The feet are permitted to remain in this solution for a period ranging from one minute to as long as one hour, the longer times being permissible with the lower proportions of nitrite in the solution. However, an immersion period of from 20 to 30 minutes is preferred, the absorption of sufficient nitrite being thereby secured to complete the curing of the feet during the final or storage period. The absorption of excessive quantities of nitrite will result in the ultimate formation of brownish and greenish pigments and the production of undesirable colors in the final product. At the end of the immersion period, the solution is drained from the feet and they are then ready for the final packing step. If it is necessary to delay the packing of the feet for any reason at this stage of operation, they may be immersed in dilute vinegar of say 20 to 45 grain strength.

If desired, instead of effecting the treatment of the cooked feet with an immersion solution containing both sodium nitrite and vinegar, it may be successively treated with a nitrite solution and a vinegar solution. In such case, the feet, after boning and slicing, will be immersed in a solution containing the same proportions of sodium nitrite as referred to hereinbefore, suitably for a period of 20 to 45 minutes, this solution drained off and the feet then immersed in a dilute vinegar solution of, say, 5 to 10 grain strength and preferably about 8 grain strength for a further period of 20 to 30 minutes.

During the immersion stage of the process no external heat need be applied. The temperature of the feet may vary from the initial temperature of, say, 55° to 65° F. to a temperature, depending upon prevailing temperatures, of 75 to 100° F., or even somewhat higher, and mild heating may be employed, if desired.

At the completion of this stage of the operation, the lean meat may or may not have taken on a slight pink cast, which develops to a somewhat greater extent if it is necessary to hold the feet under the nitrite-free vinegar solution for any extended period of time. The skin color, on removal of the feet from the immersion bath, does not present as good an appearance as it does after the cooking operation and may even have acquired a grayish cast. However, the desired skin color develops in the storage and curing stage of the operation.

After the feet have passed through the immersion stage of the operation, they are packaged in the usual manner. The containers are filled with dilute vinegar to secure the desired flavor in the final product, say of 45 to 55 grain strength and containing a small amount of salt, say 2.5 to 3%, which is added for flavoring only and does not have any appreciable effect in the curing operation. With larger containers, the more dilute vinegar of about 45 grain strength is used whereas in smaller containers, such as the conventional 9 ounce jars, the stronger vinegar of 55 grain strength is used. In filling the jars, the vinegar is allowed to overflow the jar to flush out any fine floating fat or meat particles and the jar is then covered and sealed under vacuum.

The jars or containers are then stored at a temperature of 50° to 65° F. and preferably 55° to 60° F. for a period of at least 7 days and preferably for a period of at least 14 days. Higher temperatures may be employed and may, in fact, hasten the cure, but are less safe from the standpoint of bacterial growth. During this storage period, the curing continues, possibly as a result of the prior absorption of the nitrite by the feet. Immediately after filling the containers and at the beginning of the storage period the liquid in the jars is somewhat turbid in appearance, the skin color may range from a grayish to a light tan color and the lean portion has a dull red-gray cast. During storage, there is a steady and perceptible change in appearance as the curing proceeds; the lean meat gradually assumes the conventional pink color and the skin redevelops a pink cast. At the same time, the liquid gradually clarifies. At the end of one week, the appearance of the product in the jar is the same as that of the product made by the conventional process; and at the end of the normal two weeks storage period, the appearance is superior to that of the conventionally packed product. Its appearance continues to improve with time. A highly uniform coloration of the lean meat is secured. Storage may then be continued for an indefinite period, as determined by market conditions, or the packed material may be distributed in the regular channels of the trade.

It has been found that the color developed in the product by the process of the present invention is more stable and less subject to change on oxidation than the color of the product made by the conventional process. Thus, in the packing of the product of the conventional process, incomplete evacuation of air trapped in the meat may result in the presence of some residual oxygen in the container, which tends to have a deleterious effect on the uniformity of color of the product on the shelves of distributors. This effect is practically non-existent with the product of the present process. Thus, in experiments conducted to determine the effect of oxidation by air upon the product, it is found that the pigments resulting from the process of the present invention, particularly in the lean meat, have over five times the life of the pagments formed during the conventional curing process. Likewise, the pigments formed in the product by the present process have been found to be more stable toward heat and toward direct sunlight than those resulting from the conventional process.

In processes hitherto used, heat has generally been relied upon to induce or develop the color changes resulting from the action of the nitrite. In carrying out the present process, it has been found that at low temperatures of operation, a more satisfactory development of the color changes may be secured as a result of the action of the acid of the vinegar employed. Indeed, in carrying out the present invention, the feet may be cooked in ordinary water, or in an aqueous salt solution of 2 to 10% concentration, without the addition of salt, nitrite or vinegar and this cooking operation followed with the second or cold immersion stage of operation and the final or cold curing stage as described above, with the production of products comparable with those secured by the conventional procedures.

However, it is preferred to carry out the first heating stage of the operation as above described, since thereby a highly superior product is secured.

As is readily apparent, the process of the present invention may be applied to other meat products than pigs' feet and portions thereof, such as calves or lamb tongues, sliced ox tongues, or the like. Although the invention has been described in connection with the details of a specific application thereof, it is not intended that these details shall be regarded as limitations upon the scope of the invention, except insofar as included in the accompanying claims.

I claim:

1. The method of curing meat products which comprises the steps of immersing the cooked meat products in a dilute solution of sodium nitrite containing from about 50 to about 200 p. p. m. of the nitrite thereby effecting absorption of the nitrite in the meat, and subsequently packing the meat products in dilute vinegar and storing the packed meat products for at least seven days, to effect the curing and coloring of the meat product.

2. The method of curing meat products which comprises the steps of immersing the cooked meat products in a solution containing 50 to 200 p. p. m. of sodium nitrite and sufficient vinegar to give an acetic acid concentration of 0.50 to 1.5%, to effect absorption of nitrite by the meat products, and subsequently packing and storing the meat products under dilute vinegar of 45 to 55 grain strength at a temperature of 50° to 65° F. to effect the curing and coloring of the meat product.

3. The method of curing meat products which comprises the steps of cooking meat products in a dilute aqueous solution containing from about 10 to 180 p. p. m. of sodium nitrite, cooling the cooked meat products, immersing them in a solution of sodium nitrite containing 50 to 200 p. p. m. of the nitrite and subsequently packing and storing the treated meat products under diluted vinegar of 45 to 55 grain strength at a temperature of 50° to 65° F. to complete the curing thereof.

4. The method of curing meat products which comprises the steps of cooking the meat products in a dilute aqueous solution containing 2 to 10% of salt and 50 to 180 p. p. m. of sodium nitrite, acidulated with vinegar to a pH of 7.5 to 5.0, cooling the cooked meat products, immersing them in a solution of sodium nitrite containing 50 to 200 p. p. m. of the nitrite, and subsequently packing and storing the treated meat products under diluted vinegar of 45 to 55 grain strength at a temperature of 50° to 65° F. to complete the curing thereof.

5. The method of curing meat products which comprises the steps of cooking meat products in a dilute aqueous solution containing 2 to 10% of salt and 50 to 180 p. p. m. of sodium nitrite, acidulated with vinegar to a pH of 7.5 to 5.0, cooling the cooked meat products, immersing them in a solution of sodium nitrite containing 50 to 200 p. p. m. of the nitrite and sufficient vinegar to give an acetic acid concentration of 0.50 to 1.50%, and subsequently packing and storing the treated meat products under diluted vinegar of 45 to 55 grain strength at a temperature of 50° to 65° F. for at least fourteen days to complete the curing thereof.

6. The method of curing meat products which comprises the steps of cooking meat products in a dilute aqueous solution containing 2 to 10% of salt and 50 to 180 p. p. m. of sodium nitrite, cooling the cooked meat products, immersing them in a solution of sodium nitrite containing 50 to 200 p. p. m. of the nitrite and sufficient vinegar to give an acetic acid concentration of 0.50 to 1.50%, and subsequently packing and storing the treated meat products under diluted vinegar of 45 to 55 grain strength at a temperature of 50° to 65° F. for at least fourteen days to complete the curing thereof.

7. The method of curing meat products which comprises the steps of immersing the meat products in a cooking liquor containing 2 to 10% of salt and 50 to 180 p. p. m. of sodium nitrite, heating gradually and progressively to increase the temperature within the meat product to 130° to 140° F. in the period of 1.5 to 2 hours, thereby effecting removal of blood from minute blood vessels, then heating to cooking temperature and cooking the meat products, cooling the cooked meat products, immersing them in a solution of sodium nitrite containing 50 to 200 p. p. m. of the nitrite and subsequently packing and storing the treated meat products under diluted vinegar of 45 to 55 grain strength at a temperature of 50° to 65° F. for at least fourteen days to complete the curing thereof.

8. The method of curing meat products which comprises the steps of immersing the meat products in a cooking liquor containing 4 to 6% of salt, 100 to 150 p. p. m. of sodium nitrite, and sufficient vinegar to give a pH of 6.0 to 5.5, heating gradually and progressively to increase the temperature within the meat product to 130° to 140° F. in the period of 1.5 to 2 hours, thereby effecting removal of blood from minute blood vessels, then heating to cooking temperature and cooking the meat products at a temperature of 200° to 208° F., cooling the cooked meat products, immersing them in a solution of sodium nitrite containing about 125 p. p. m. of the nitrite and vinegar to give an acetic acid concentration of about 0.75% for 20 to 30 minutes to effect absorption of nitrite therein, and subsequently packing and storing the treated meat products under diluted vinegar of 45 to 55 grain strength at a temperature of 55° to 60° F. for at least fourteen days to complete the curing thereof.

9. In the method of cooking and partially curing meat products, the steps of initially heating the meat products immersed in an aqueous solution containing 2 to 10% of salt and 50 to 180 p. p. m. of sodium nitrite, slightly acidulated with vinegar, progressively and gradually to a temperature of 130° to 140° F. in a period of 1.5 to 2 hours, thereby removing blood from the blood vessels of the meat products, continuing the heating to raise the meat products to a cooking temperature of 200° to 208° F. and completing the cooking thereof.

10. In the method of cooking and partially curing meat products, the steps of initially heating the meat products immersed in an aqueous solution containing 4 to 6% of salt and 100 to 150 p. p. m. of sodium nitrite, slightly acidulated with vinegar, progressively and gradually to a temperature of 130° to 140° F. in a period of 1.5 to 2 hours, thereby removing blood from the blood vessels of the meat products, continuing the heating to raise the meat products to a cooking temperature of 200° to 208° F. and completing the cooking thereof.

JOHN S. FORSYTH.

REFERENCES CITED

The following references are of record in the file of this patent:

UNITED STATES PATENTS

| Number | Name | Date |
|---|---|---|
| 2,117,478 | Hall | May 17, 1938 |

OTHER REFERENCES

"Food Industries," November 1935, page 533, article entitled "Acid Cure for Meat."